: (12) United States Patent
Faizan et al.

(10) Patent No.: US 11,408,397 B2
(45) Date of Patent: Aug. 9, 2022

(54) WIND POWERED SYSTEM TO LIFT WATER USING MULTIPLE TANKS

(71) Applicant: Mirza Faizan, Irving, TX (US)

(72) Inventors: Mirza Faizan, Irving, TX (US); Mohammad Ayaan, Plano, TX (US); Mariya Kawish, Plano, TX (US); Faizaan Syed Hussain, Plano, TX (US); Maryam Abid Bhojwani, Plano, TX (US); Bilal Syed Ali Shah, Murphy, TX (US); Nimra Syeda Ali Shah, Murphy, TX (US)

(*) Notice: Subject to any disclaimer, the term of this patent is extended or adjusted under 35 U.S.C. 154(b) by 0 days.

(21) Appl. No.: 17/185,083

(22) Filed: Feb. 25, 2021

(65) Prior Publication Data

US 2021/0270240 A1     Sep. 2, 2021

Related U.S. Application Data

(60) Provisional application No. 62/982,745, filed on Feb. 27, 2020.

(51) Int. Cl.
*F03D 9/28*     (2016.01)
*F03D 7/02*     (2006.01)

(52) U.S. Cl.
CPC ............. *F03D 9/28* (2016.05); *F03D 7/0276* (2013.01)

(58) Field of Classification Search
CPC ................... F03D 9/28; F03D 7/0276
See application file for complete search history.

(56) References Cited

U.S. PATENT DOCUMENTS

2010/0320772 A1* 12/2010 Efratyi .................... F03D 9/28
290/55

* cited by examiner

*Primary Examiner* — Viet P Nguyen

(57) ABSTRACT

A system for pumping water from a lower tank water source 10 that is operable in association with the windmill 12,13 having a tower frame i.e supporting pillar 18, and rotating cylinder 19 connected to the windmill. The system includes a rotating cylinder 19 linked to the windmill which rotates on the rotation of the windmill driven by the wind. The pipes 20 operate through the motion of the rotating cylinder 19 and delivers a flow of compressed water from the lower tank 10 to a point above i.e upper tank 11. The speedometer 21 drives the pipe to intermediate tanks on the basis of the rotation generated by the rotating cylinder 19. The microprocessor 22 automatically switches pipe in various tanks based on the speedometer 21.

5 Claims, 3 Drawing Sheets

WIND POWERED SYSTEM TO LIFT WATER USING MULTIPLE TANKS

TECHNICAL FIELD

The present invention relates generally to a windmill, and more specifically to a water pumping system adapted to be driven by a windmill that lifts water using wind energy.

BACKGROUND

Wind is a renewable energy source. A Turbine or A tower uses the kinetic energy of wind to generate mechanical energy, and convert the mechanical energy to useful work. The Wind towers or turbines typically have one or more blades that may face into or away from the wind. As the wind causes the blades to rotate, the shaft in the turbine spins. The mechanical energy generated may be used to power certain tasks, like pumping water. Water pumping windmills may be found on farms and ranches worldwide and provide critical water supply for domestic and livestock use, especially in areas where electricity and fuel-driven pumps are not practical. Wind power has the advantage of being a free, renewable energy source. This type of windmill pumps water using pipe 20 submerged below the static water level. The invention also utilizes a rotational cylinder that is controlled to effectuate the water compression cycle The rotation cylinder is conventionally connected and supported by a water discharge pipe 20 which leads water to the uppertanks, with the rotation of blades of the windmill. This rotation creates a high pressure at the mouth of the pipe 20 in the lower, leading to water rising in the pipe 20. Water rises in pipe 20 up to the uppertank where it comes out from pipe 20. Windmills have been used traditionally for pumping water directly from wells to livestock watering troughs or for dewatering low areas to prevent flooding. To drive a pump of the size that is normally used for lifting water would require an economically large windmill for the wind velocities range. On the rotation stroke, water is sucked through the pipe 20 into the cylinder. Successive rotation strokes of the rod lift more and more water above the tanks and result in filling of the pipe 20 which are present between the lower tanks and the upper tanks. i.e intermediate tanks. From time to time, the parts just discussed, many of which need repair and replacement. Since they are located way up, this is often an easy task. Also, because less weight, including that of pipe 20s, must be moved to pump water with such apparatus, the efficiency of pumping is relatively high compared with the amount of water that could theoretically be pumped using other sources.

One of the biggest expenses of the water distribution system is to lift water from a lower level to a higher level tank as it requires a lot of energy. Currently, water distribution centers depend on large pumps that work 24×7 pumping water throughout the city tanks, causing a huge amount of electricity. A system was needed to lift water using natural and renewable resources. Non-dependability on an electric pump also makes a city more resilient in case of natural calamities causing loss of power, any efforts have been made in the past to replace the windmill pumping system powered by electrical motors and internal combustion engines. The present concern relates only to such efforts that have sought to improve upon wind-driven pumping systems. The present invention discloses a water pumping device in which rotation is generated by a windmill, lifting is, controlled through a speed regulator, and delivered water to intermediate tanks in accordance with the rotation at windmill blades.

For Example, U.S. Pat. Nos. 4,385,871 and 4,358,250 provide examples of inventions generally related to the conversion of wind energy into compressed air for water pumping. These earlier efforts, however, also do not address an appropriate adaptation of the air compressing mechanism to the typical windmill structure or the utilization of the same in conjunction with an air injection type water pump.

The present concern relates only to such efforts that have sought to improve upon wind-driven pumping systems. One effort in the past is described in U.S. Pat. No. 3,367,281 issued to Gray on Feb. 6, 1968, entitled APPARATUS FOR PUMPING WATER FROM WELLS USING WIND POWER. The Gray patent discloses a water pumping device in which compressed air is generated by a windmill, stored in a tank, controlled through a pressure regulator, and delivered to a displacement type water pump. This invention, although not overly complex, is not directly adaptable to the typical windmill structure. The Gray disclosure describes a downstroke of a windmill pump rod as the compression stroke which does not lend itself well to application in conjunction with typical windmills that are designed to apply force and power on the upstroke of the pump rod. The pump rod conventionally made of wood would likely snap if used to compress air on the downstroke. The Gray invention also utilizes solenoid valves that are electrically controlled to effectuate the air compression cycle. Such electrically controlled valves are typically not practical in remote windmill locations. Finally, the Gray invention further requires the use of an air hold-up means and a pressure regulator.

The above references are intended merely to be representative of the large variety of different windmills that have been employed in the past and which suffer, in one way or another, from the various shortcomings discussed above. Efforts to eliminate the above-mentioned shortcomings, while providing a water pumping system adapted to be driven by a windmill that lifts water using wind energy which is relatively inexpensive to manufacture and is reliable in operation, have not been entirely successful and further improvements in such windmill have long been sought. It is to these ends that the present invention has been developed, particularly for use in water wells, although conceivably other fluids could be pumped as well.

A need exists, therefore, for an improved water pumping system adapted to be driven by a windmill that lifts water using wind energy which is economical to manufacture and which is reliable in operation, which can conveniently be powered by harvested energy sources, such as by wind power.

A need also exists for such a water pumping system by a windmill that lifts water using wind energy which has a particular application for lower capacity, high head applications, such as a water well for watering livestock at a remote location with a low production well.

Features and advantages of the invention will be set forth in the description that follows, and in part will be apparent from the description, or may be learned by practice of the invention. The advantages of the invention will be realized and attained by the structure particularly pointed out in the written description and claim hereof as well as the appended drawings.

It is to be understood that both the foregoing general description and the following detailed description are exemplary and explanatory and are intended to provide further explanation of the invention as claimed.

The present invention addresses the issues discussed above.

SUMMARY

It is an object of the present invention to provide a unique water pumping system for a water well operated by a windmill, wherein the water pumping system that is driven by a windmill of the present invention solves these problems by providing a windmill of a particular kind not previously used in the water well industry for the application presently envisioned. The efficiency of such a windmill is considerably greater than that of centrifugal pumps for the intended applications, and therefore a considerably smaller investment is necessary for cost and space for the solar panels or other forms of power necessary to drive it. Also, the windmill of the present invention is adaptable for use with conventional power supplies, and the greater efficiency of the water pumping system ensures lower operating costs in such instances.

It is a further object of the present invention to provide a water pumping system that is driven by a windmill that is inexpensive to produce, install, maintain and operate. The present invention provides a system for pumping water from a water source i. elower tank that is operable in association with the windmill having a tower frame, a wind-driven turbine, and a rotatingcylinder, gear assembly operably connected to the turbine, wherein movement of the turbine results into the conversion of mechanicalenergy into useful work using rotation by the wind. The unique cylinder rotation drive system for water tanks operated by a windmill. The rotation drive system comprises a pipe 20 system located in the rotating pillar for driving the pipe 20 for pumping water to the upper surface. The rotation cylinder comprises a chamber wherein various pipe 20 from the lower tank from the surface is injected into the upper tank by means of speed of the windmillAs the pressure in the lower tank builds up to a certain level, water from the tank is uplifted to tank at a higher level. The presentinvention provides one or more microprocessor 22 which automatically switches the pipe 20 based on the speedometer i.e the speed generated by the rotation of the windmill.

The windmill further comprises a rotor, wherein the rotor is used to drive the windmill, the windmill further comprises one or more blades rotating around a central vertical axis of rotation, which is oriented parallel to the vertical axis, linked by crossbars, and freely rotatable.

According to the present invention, the blades are controlled at each point of their trajectory of movement around the central vertical axis of rotation in a way so that they are powered by the wind with the greatest aerodynamic efficiency.

It is a further object of the present invention to produce a continuous power by the windmill, the blades are always so oriented to the wind direction during the path of rotation around the vertical axis to attain the optimal uplift pressure by adjusting to the direction of the wind plus or minus a certain degree depending on the angle of rotation.

It is a further object of the present invention to provides one or more speedometers 21 which determines the speeds of the windmill and on the basis of the range the speed of the windmill the microprocessor 22 will automatically switch the position of pipe 20 to the respective tank. The present invention provides a gear assemblythat variates the speed of the rotating cylinder, the amount of speed changes thepipe 20 positionsrequired to uplift water to a particular tank. i.e the high the speed of the windmill the higher it will uplift the water by recognizing the speed through the speedometers 21. The gear assembly is positioned within the windmill tower frame in line with the rotating cylinder and is held stationary with respect windmill. The action of the switching is practically instantaneous. If the wind velocity variates, pipe 20 is removed from the intermediate tanks on its own. As soon as the wind velocity increases the pipe 20 position changes from lower to higher.

Other objects, advantages, and features of this invention will become more apparent from the following description.

The details of one or more implementations are set forth in the accompanying description below. Other aspects, features, and advantages of the subject matter disclosed herein will be apparent from the description and the claims.

DRAWINGS

Figures 1A, 1B:
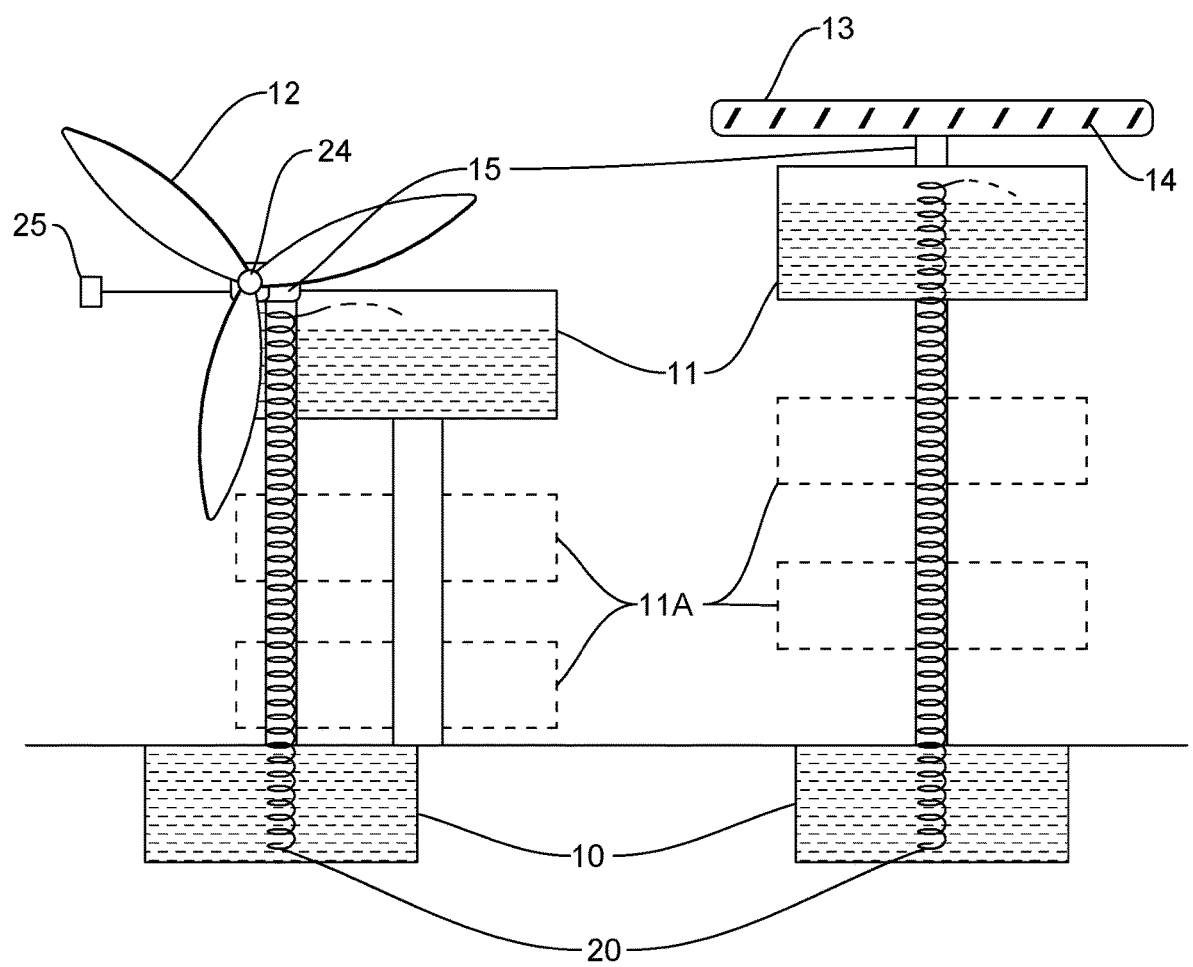
FIG. 1 illustrates one embodiment of the present invention wherein a blade-type windmill-based water lifting mechanism

| Drawings - Reference Numerals | | | |
|---|---|---|---|
| 10 | Lower water tank | 13 | Circular blade windmill |
| 11 | Upper water tank | 14 | Air catching blades |
| 11A | Intermediate water tank | 15 | Gear Assembly |
| 12 | Windmill blade | 16 | Battery |
| 18 | External Support Pillar of windmill | 19 | Inner rotating cylinder |
| 20 | Pipe | 21 | Speedometers |
| 22 | Microprocessor | 24 | Horizontal Shaft |
| 25 | Wind Orientation control | | |

DETAILED DESCRIPTION

Referring now to FIG. 1, there is illustrated a blade-type windmill-based water lifting mechanism, the system consists of a windmill head including a multiple blade rotary fan 12 mounted on a horizontal shaft 24 and disposed to face into the wind on the face of the wind orientation control 25 to turn it in the direction of the wind. The wind blows, The wind orientation control device22 adjusts the windmill and rotates the windmill blade 12. The motion of the windmill blades produces circular motion, which is transferred to internal rotating cylinder 19 through a gear assembly 15. The circular motion rotates the rotating cylinder 19 responsible for uplifting the water from lower tank 10. The gear assembly mounted on the windmill is used to multiply the rotating speed of internal rotating cylinder 19 to make it rotate faster so that water upliftment occurs at a faster rate. When the internal rotating cylinder 19 rotates, thepipes 20 which are wounded up the internal rotating cylinder 19 also rotate. Power is transmitted from the gear assembly15 through a battery 16 mounted on the windmill. Pipe 20 is driven by the mechanical output of the windmill. The rotation of the rotating cylinder creates high pressure at the mouth of pipe 20 in the lower tank 10, leading to water rising in pipe 20. Water rises in pipe 20 up to upper water tank 11 where it comes out from pipe 20 and is stored in the upper water tank. There often come times where we need to lift water too high, the rotation speed might not be sufficient to lift the water directly from lower tank 10 to upper tank 11. In such a situation, there will be series of Intermediate tanks 11 which are held between the upper tank and lower tank 10 The system comprises a no of speedometers 21 mounted at the windmill. The speedometers 21 determine the rotation speed of the rotating cylinder or the windmill. The microprocessor 22 present onboard system will automatically switch the pipe 20 from the lower tank to the intermediate tank based on the speed determined by the speedometers 21. These intermediate tanks at spaced at such a distance from each other so that rotation is sufficient to lift the water. This way, water may be lifted from lower tank 10 to upper tank 11 using a relay of water tanks 11A.

Figure 2:
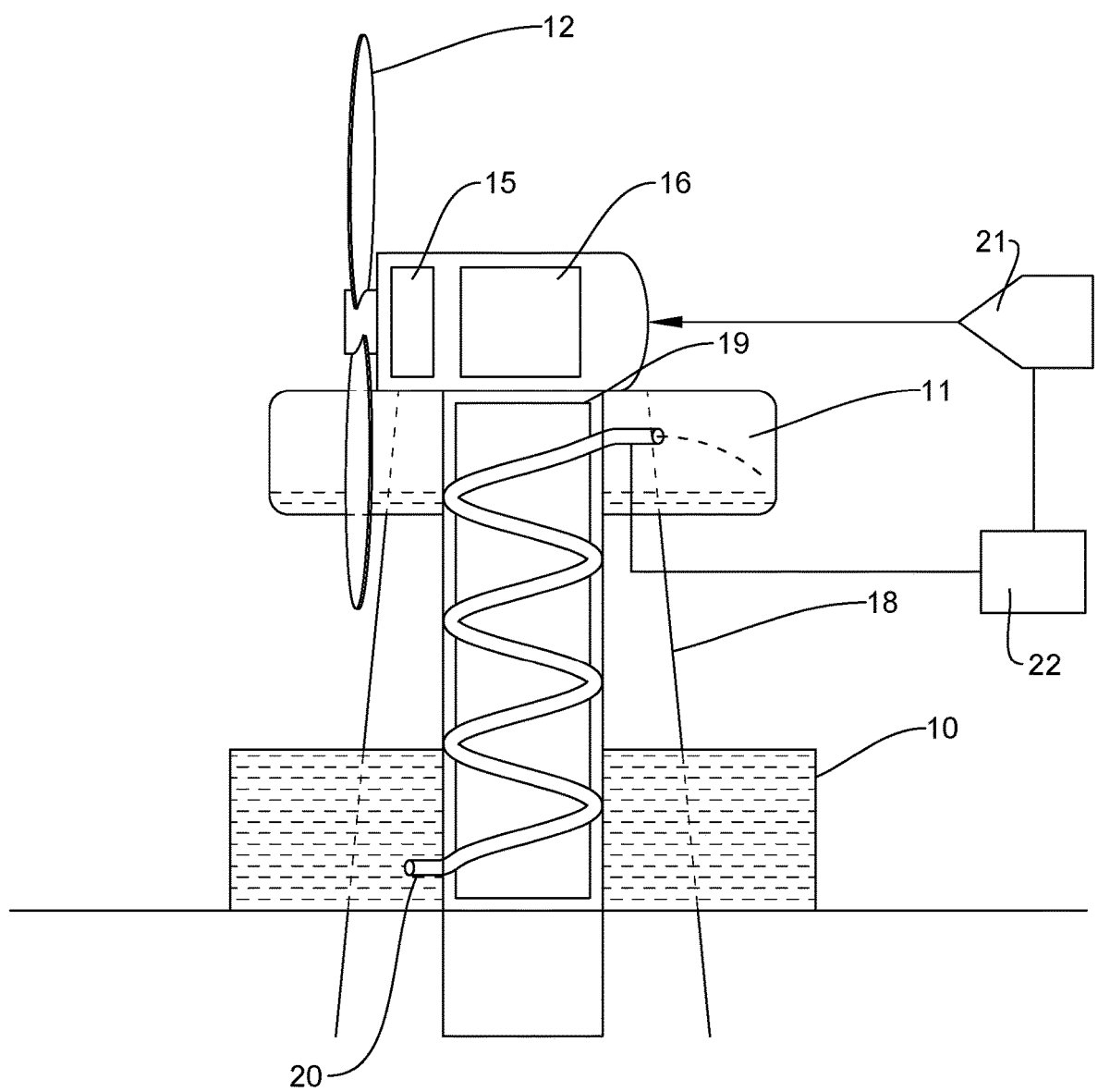
FIG. 2 illustrates one embodiment of the present invention wherein a circular blade type windmill-based water lifting mechanism.

Reference is now made to FIG. 2 there is illustrated a circular type windmill based water lifting mechanism, the system consists of a windmill head including a multiple circular blades rotary fan 13. The wind blows, the wind orientation control device22 adjusts the windmill and rotates the windmill blade 13. The motion of the windmill blades produces circular motion, which is transferred to internal rotating cylinder 19 through a gear assembly 15. The circular motion rotates the rotating cylinder 19 responsible for upliftment the water from lower tank 10. The gear assembly mounted on the windmill is used to multiply the rotating speed of internal rotating cylinder 19 to make it rotate faster so that water upliftment occurs at a faster rate. When the internal rotating cylinder 19 rotates, the pipe 20 20 20 which is wounded up the internal rotating cylinder 19 also rotates Power is transmitted from the gear assembly through a battery mounted on the windmill. ipe 20 is driven by the mechanical output of the windmill. The rotation of the rotating cylinder creates high pressure at the mouth of pipe 20 in the lower tank 10, leading to water rising in pipe 20. Water rises up in pipe 20 up to upper water tank 11 where it comes out from pipe 20 and is stored in the upper water tank. There often come times where we need to lift water too high, the rotation speed might not be sufficient to lift the water directly from lower tank 10 to upper tank 11. In such a situation, there will be series of Intermediate tanks 11 which are held between the upper tank and lower tank 10 The system comprises a no of speedometers 21 mounted at the windmill. The speedometers 21 determine the rotation speed of the rotating cylinder or the windmill. The microprocessor 22 present onboard system will automatically switch the pipe 20 from the lower tank to an intermediate tank based on the speed determined by the speedometers 21. These intermediate tanks 11 A are spaced at such a distance from each other so that rotation is sufficient to lift the water. This way, water may be lifted from lower tank 10 to upper tank 11 using a relay of water tanks 11A.

Figure 3:
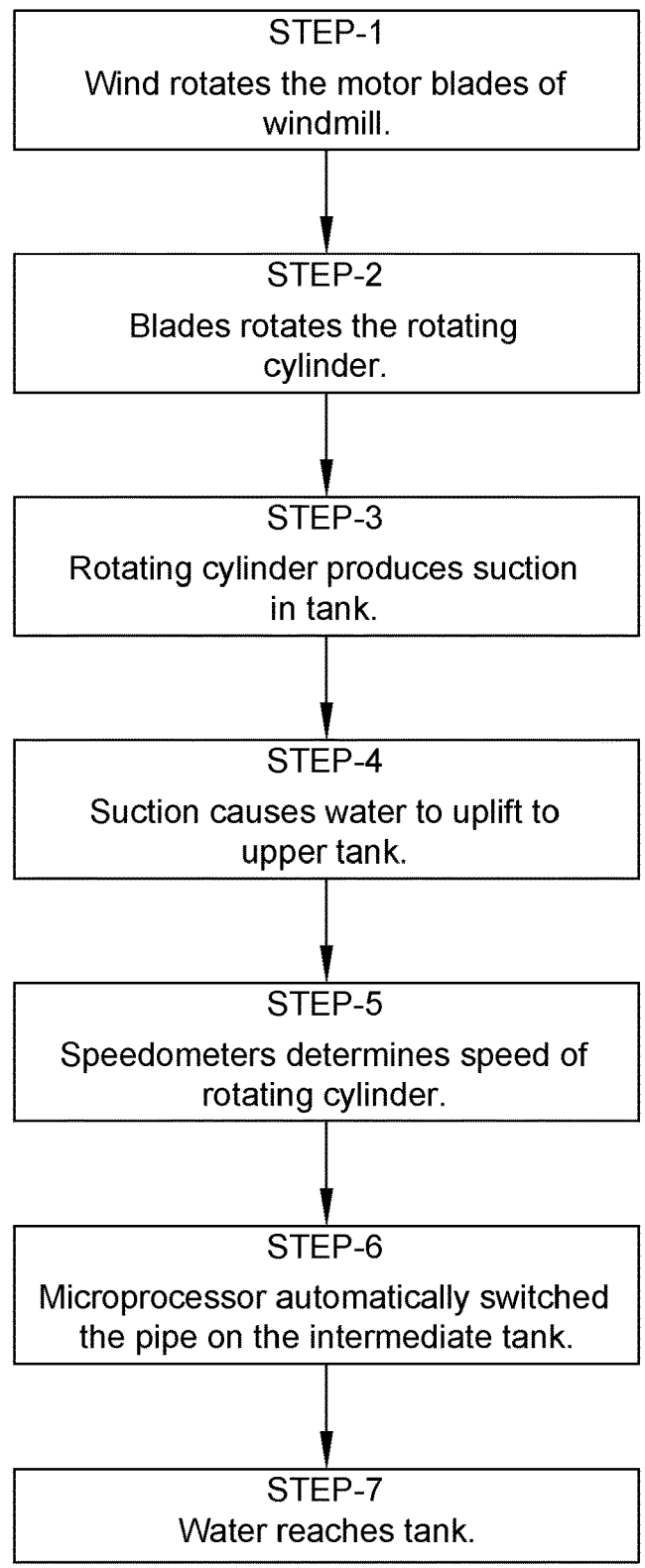
FIG. 3 shows the flow diagram of the working of the present invention.

FIG. 3 shows the flow diagram of the working of the present invention. At step 1, the wind rotates one or more rotor blades of the windmill. At step 2, The rotation of the blades transfers circular motion to a rotating cylinder 19. At step 3, The rotation of the rotating cylinder 19 produces suction in a lower tank. At step 4, the more the speed the more the suction rate so a gear assembly multiplies the speed of the rotating cylinder. After suction water moves to pipe 20 to fill the upper tank. At step 5 a speedometers 21 determines the speed of the rotating cylinder. At step 6, a micro processor 22 depending on the speed of rotation, switches the pipe 20 of the intermediate tanks 11 Ain the system. At step 7, The water reached to the desired tank.

The invention claimed is:

1. A system for pumping water from a lower tank to an upper tank, said system comprising:
   a windmill operable in association with said system;
   a plurality of speedometers mounted at said windmill; and
   a plurality of microprocessor presented onboard said system,
   wherein said windmill having a tower frame, a wind-driven turbine positioned at an apex of said tower frame, and a rotating cylinder operably connected to the said wind-driven turbine and positioned between the wind-driven turbine and the ground,
   wherein the rotating cylinder is wounded up by a plurality of pipes,
   wherein rotation of the wind-driven turbine causes rotation of the rotating cylinder,
   wherein the rotating cylinder creates a suction,
   wherein the suction causes high pressure at a mouth of the pipe in the lower tank to rise the water in the plurality of pipes,
   wherein the plurality of speedometers determines rotation speed of the rotating cylinder or said windmill, and
   wherein the plurality of microprocessor automatically switches a discharge end of the plurality of pipes from the upper tank to an intermediate tank based on the rotation speed determined by the plurality of speedometers.

2. The system of claim 1, further comprising a gear assembly that multiplies the speed of the rotating cylinder.

3. The system of claim 1, wherein the intermediate tank is located between the upper tank and the lower tank.

4. The system of claim 1, further comprising a series of intermediate tanks which are located between the upper tank and the lower tank.

5. The system of claim 4, wherein the series of intermediate tanks are spaced at a distance such that the rotation of the rotating cylinder is sufficient to lift the water.

* * * * *